United States Patent [19]

Krüger

[11] Patent Number: 4,849,677
[45] Date of Patent: Jul. 18, 1989

[54] TEMPERATURE MONITORING FOR A DC SHUNT-WOUND MOTOR

[75] Inventor: Michael Krüger, Edingen-Neckarhausen, Fed. Rep. of Germany

[73] Assignee: Heidelberger Druckmaschinen AG, Heidelberg, Fed. Rep. of Germany

[21] Appl. No.: 177,894

[22] Filed: Mar. 29, 1988

Related U.S. Application Data

[63] Continuation of Ser. No. 928,904, Nov. 7, 1986, abandoned.

[30] Foreign Application Priority Data

Nov. 13, 1985 [DE] Fed. Rep. of Germany ....... 3540166
Aug. 26, 1986 [DE] Fed. Rep. of Germany ....... 3632671

[51] Int. Cl.⁴ .......................... H02H 5/04; H02H 7/08
[52] U.S. Cl. ...................................... 318/473; 361/25
[58] Field of Search .............. 318/244, 245, 251, 252, 318/331, 434, 471, 472, 473; 361/23, 24, 25, 30, 31, 33, 87

[56] References Cited

U.S. PATENT DOCUMENTS

| 4,216,421 | 8/1980 | Dupont | 318/471 |
| 4,394,607 | 7/1983 | Lemirande | 318/471 X |
| 4,547,826 | 10/1985 | Premerlani | |

FOREIGN PATENT DOCUMENTS

| 1144595 | 4/1983 | Canada | 318/471 |
| 2833286 | 2/1979 | Fed. Rep. of Germany | 318/473 |
| 57-62796 | 4/1982 | Japan | 318/473 |
| 2075291 | 11/1981 | United Kingdom | 318/473 |

Primary Examiner—Bentsu Ro
Attorney, Agent, or Firm—Herbert L. Lerner; Laurence A. Greenberg

[57] ABSTRACT

A device for monitoring the temperature in a DC shunt-wound motor for driving rotary printing machines includes a temperature measuring sensor formed of a DC shunt winding of the DC shunt wound motor.

9 Claims, 4 Drawing Sheets

TEMPERATURE MONITORING FOR A DC SHUNT-WOUND MOTOR

This application is a continuation of application Ser. No. 928,904, filed Nov. 7, 1986, now abandoned.

The invention is related to a device for monitoring the temperature in DC shunt-wound motors for driving rotary printing machines.

BACKGROUND OF THE INVENTION

DC shunt-wound motors having shunt windings, which are supplied with constant current, are used for the main drive of rotary printing machines. The maximum continuous output of a DC shunt-wound motor is determined by a maximum temperature value. Provided no operational malfunctions or disruptions occur, this temperature is not exceeded even under continuous operation of the DC shunt-wound motor at its rated torque. When operational malfunctions occur, e.g. due to inadequate cooling of the motor or to extraordinary ambient conditions, for example, unusually high external temperature, overloading of the DC shunt-wound motor may occur. This can lead to damage or destruction of the motor.

As is generally known, thermocouples are installed in the stator windings of motors as a protective measure, and produce a signal by means of an evaluation unit at a given winding temperature, the signal being applicable for switching off the motor or for the implementation of other safety measures. A disadvantage of this solution for overheating protection is that these thermocouples are only in contact with the windings which are to be monitored, i.e. winding temperature is measured only indirectly. There is also the problem of insulating from potential-loaded i.e. voltage carrying components in the motor and in the thermo-sensor. A further disadvantage is the additional requirement for wiring connections in the terminal box, which can, inter alia, be mistakenly interchanged during connection of the motor. Furthermore, other supply lines are necessary, representing a further source of possible malfunction which may lead to failure of the drive. Extra amplifiers are required for evaluation of thermocouples and, under certain conditions, they must perform a linearization of the characteristic curve of the measuring element, and are to be calibrated, if necessary.

If non-continuous temperature sensors are used, several elements are necessary for monitoring and switching off.

A further disadvantage encountered with all thermocouples is that heating is measured at only one point, which means that the maximum temperature may, under certain circumstances, not be determined.

The monitoring of coolant flow in motors is also subject to a great susceptibility to malfunction and inaccuracy. Furthermore, only indirect evaluation of the actual motor temperature can be obtained by means of such coolant monitoring.

A further conventional facility for monitoring is provided by simulating the temperature behavior of the motor with the aid of temperature models. In this regard, the anticipated temperature over time is determined by means of measuring the operating current. Disadvantages of this system are that changes in ambient conditions or coolant flow cannot be detected and, furthermore, the preliminary condition of motor heating must be set, and also continued even with the drive shut off, respectively.

SUMMARY OF THE INVENTION

In view of the current state of the art, it is an object of the invention to provide a temperature monitor for determining the temperature of a DC shunt-wound motor used as the main drive for a printing machine which avoids the foregoing disadvantages.

With the foregoing and other objects in view, there is provided, in accordance with the invention, a device for monitoring the temperature in a DC shunt-wound motor for driving rotary printing machines, comprising a temperature measuring sensor formed of a DC shunt winding of the DC shunt wound motor.

With such a construction, according to the invention, it is possible to dispense with additional thermocouples and temperature sensors in the temperature monitoring of a DC shunt-wound motors. Additional amplifiers, connecting lines and connecting elements, such as plugs and terminals, can thus also be dispensed with. The magnitude of the response value for temperature monitoring can be selected at random if continuous monitoring is used, notwithstanding the type of motor which is used.

It is advantageous if temperature monitoring can be performed using circuitry which registers field voltage at a constant field current and determines, with the assistance of an evaluation circuit, the values for winding temperature and the mean value for spatially distributed heating of the DC shunt-wound motor. After the permissible maximum value of the temperature has been exceeded, the DC shunt-wound motor can be switched off, or another measure for protection of the drive, such as reduction of rotary speed, can be implemented.

Under these preconditions, and upon the assumption that malfunctions or disruptions in the drive are detected, such as field failure, for example, or blockage of the motor, the stator temperature can thus be regarded as an adequate criterion for assessment of the overall heating-up of a DC shunt-wound motor. High acceleration or overload torques which exceed the rated torque are unnecessary in the case of DC shunt-wound motors used for driving a printing machine.

An especiallly advantageous construction of the temperature monitor according to the invention permits timely detection of an excessive temperature. In this case, a permissible maximum temperature increase behavior is compared with the temperature increase behavior occurring after the motor has been switched on. The maximum permissible temperature increase can be determined in several possible manners. A first possibility is to determine the corresponding value by experimental measurements and to make it available as a parameter to the device. A further possibility requires a memory or storage device. The permissible maximum temperature increase value is ascertained in a test run and stored in memory. Yet another possibility is always to determine the temperature increase behavior repeatedly after each start-up of the motor from the cold condition. The maximum temperature increase behavior which is determined in accordance with one of the foregoing possibilities is compared with the instantaneous temperature increase in a comparator and, if the instantaneous temperature increase is greater than the stored value, a warning signal is generated. Thus, a switch-off of the motor may be initiated at an instant of time at which maximum heating has not yet been reached. Local damage to the winding or other motor parts is thereby avoided.

A further possible construction of the temperature monitor, according to the invention, calls for means for monitoring the permissible maximum temperature in accordance with or dependent upon the rotary speed. This embodiment is especially sensitive to cooling of the motor and is not constant which is the case for automatically ventilating motors with axial fans. To realize this construction, information, such as rotary speed or another value associated with the rotary speed, such as rotor or armature voltage, for example, must be fed to the control system.

In accordance with another feature of the invention, there is provided an evaluation circuit for ascertaining a field voltage in the DC shunt winding for a constant field current, and means for determining the field voltage, the winding temperature and a mean value of spatially distributed heating of the DC shunt-wound motor.

In accordance with an added feature of the invention, there is provided means for switching off the motor after a permissible maximum value of the temperature is exceeded.

In accordance with an additional feature of the invention, there is provided means for generating a warning signal after a given temperature limiting value is exceeded.

In accordance with a further feature of the invention, there is provided means for reducing the rotary speed of the motor after a given temperature limiting value is exceeded.

In accordance with yet another feature of the invention, there is provided a memory wherein a maximum temperature increase behavior per unit time within a given temperature range during normal operation of the motor is stored, a comparator for comparing the maximum temperature increase behavior, during operation of the motor, with a respective instantaneous temperature increase per unit time, and means for generating a warning signal when an instantaneous temperature increase is greater than the stored temperature increase behavior.

In accordance with yet an additional feature of the invention, there is provided a memory wherein a maximum temperature increase behavior per unit time within a given temperature range during normal operation of the motor is stored, a comparator for comparing the maximum temperature increase behavior, during operation of the motor, with a respective instantaneous temperature increase per unit time, and means for switching off the motor when an instantaneous temperature increase is greater than the stored temperature increase behavior.

In accordance with yet a further feature of the invention, there is provided a memory in which a maximum temperature increase behavior per unit of time within a given temperature range during normal operation of the motor is stored, a comparator for comparing the maximum temperature increase behavior during operation of the motor with a respective instantaneous temperature increase per unit time, and means actuable in response to an instantaneous temperature increase which is greater than the stored temperature increase behavior, the stored temperature increase behavior being determined in accordance with characteristics of the motor.

In accordance with a concomitant feature of the invention, there is provided a rotary speed sensor having a signal output, the motor temperature being determinable in accordance with the output signal of the rotary speed sensor.

Other features which are considered as characteristic for the invention are set forth in the appended claims.

Although the invention is illustrated and described herein as embodied in temperature monitoring, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
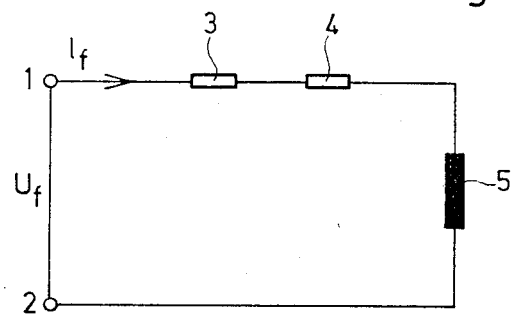
FIG. 1 is an equivalent electric circuit diagram for a shunt winding.

Referring now to the drawing and first, particularly, to FIG. 1 thereof, there is presented a circuit diagram which is an equivalent circuit diagram for the field excitement of a DC shunt-wound motor. The prescribed field current $I_f$ (f=field) flows from a connection point 1 via a resistance $(R_v)3$, which represents the sum of all conductive resistances located between the shunt winding and the field current source 1, via the $(R_f)4$ of the shunt winding and the inductance $(L_f)5$ of the shunt winding to a connecting point 2.

At a given constant field current $I_f$ and a reference temperature, a voltage $U_f$ determined by the known values of the resistances $R_v$ and $R_f$, is established. Heating the DC shunt-wound motor a given temperature increase $\Delta Tx$ causes the resistance of the winding to increase:

$$R_{fx} = R_f(1 + \Delta Tx \cdot \gamma)$$

and the voltage $U_f$ then rises to the value
$$U_{fx} = (R_f + R_{fx}) I_f.$$

The temperature increase can be determined by measuring the field voltage $U_f$. A temperature-proportional signal can be determined using the evaluation circuit according to the invention shown in FIG. 2 and described hereinafter in greater detail.

Figure 2:
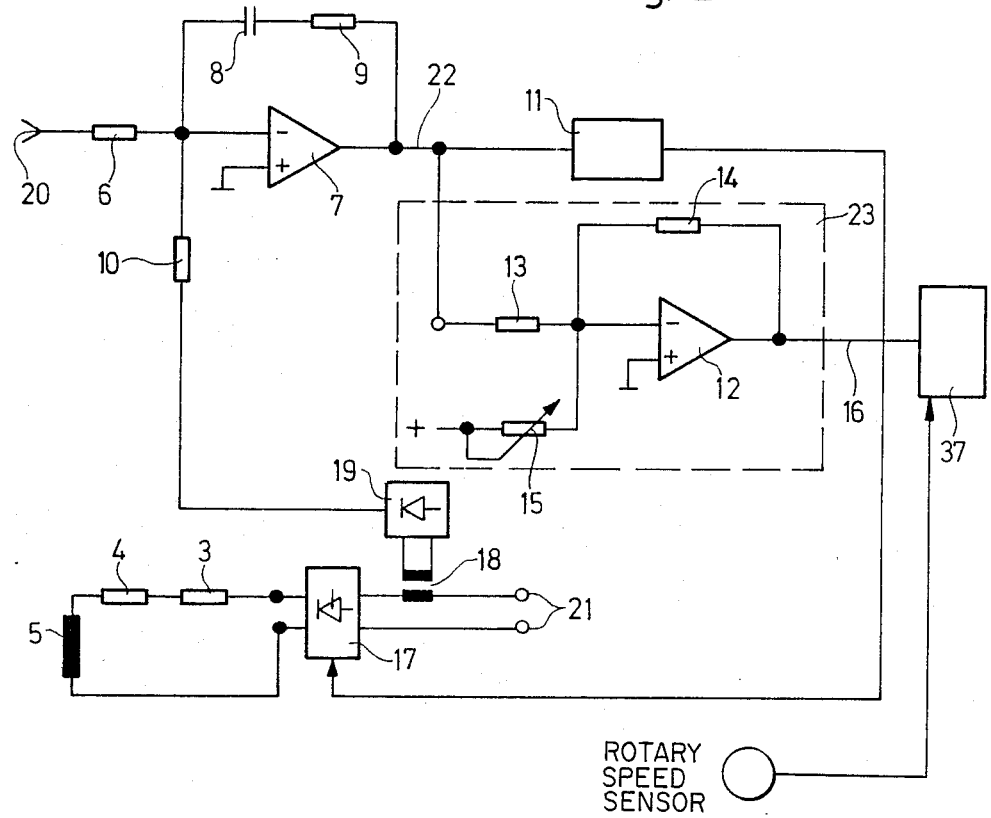
FIG. 2 is a diagram of a circuit for supplying a shunt winding with constant field current together with an evaluation circuit for determining a temperature-proportional signal.

The circuit shown in FIG. 2 is formed of a field current control circuit, as employed in a conventional manner in applications with constant field current, and additional circuitry 23 required for generation of a temperature proportional signal. The field exciter circuit of the shunt-wound motor 3, 4, 5 is fed from a controllable DC current source, which, in this case, for example, is a controllable AC bridge-type rectifier 17. For this purpose, a voltage set point 20 or a voltage set at a nominal value is applied to the input of the field current control circuit, and is fed via a weighting resistance 6 to a PI controller circuit 7, 8, 9. The PI controller circuit 7, 8, 9 also receives information via a weighted resistance 10 regarding the magnitude of the actual value of the field current actual with reversed signs, this value having been obtained with the aid of a current transformer 18 and succeeding rectifier 19.

From the difference between the set or nominal and actual values, the PI controller circuit generates, in a conventional manner, an output signal 22 which serves to trigger a succeeding pulse control set 11. This impulse control set 11 functions in a conventional manner, in accordance with the principle of sinusoidal vertical control and serves for generating ignition impulses for the succeeding bridge-rectifier circuit 17. In the employed control process, the output DC voltage is independent of mains voltage fluctuations proportionally to the control voltage 22. The control voltage is thus a measure of the field voltage $U_f$. To generate a temperature-proportional signal, the control voltage is fed via a weighting resistance 13 to a summing circuit, which is formed of an amplifier 12 with adjustable amplification 14. A positive voltage value, which can be set by using a potentiometer 15 is added to the negative control voltage. With the aid of the potentiometer 15, the summing circuit is calibrated once with the DC shunt-wound motor, in cold condition (room temperature). Calibration is advantageously performed by setting the output voltage of the amplifier 12 to 0 with the motor in cold condition.

Heating up the motor causes the resistance 4 of the shunt winding to increase. At a given field voltage, the field current $I_f$ and, accordingly, the voltage are reduced, whereby the control voltage at the output of an operational amplifier 7 rises. The field voltage increases as a result of this, and the field current is readjusted to its original value. The control voltage and, thus, the output voltage 16 of the amplifier 12 rises as a result of the increased internal resistance. Naturally, the inventive concept is also applicable to other types or embodiments of circuitry and control processes for field current supply, for example, cyclically operating field current regulators, semi- and fully controlled bridge-circuits and the like. The inventive concept can also be applied to circumstances wherein the field winding of the DC shunt-wound motor is supplied with constant voltage.

Figure 3A:
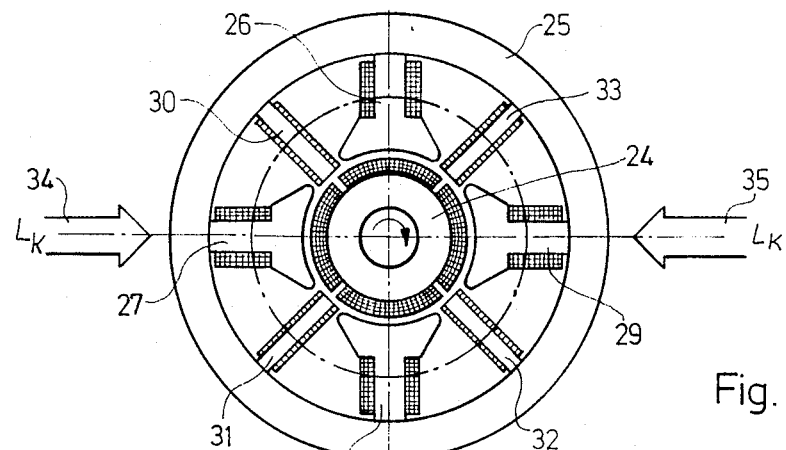
FIGS. 3a and 3b are diagrammatic cross-sectional views of a motor, respectively, during normal operation and during operation with a failed cooling device.
Figure 3C:
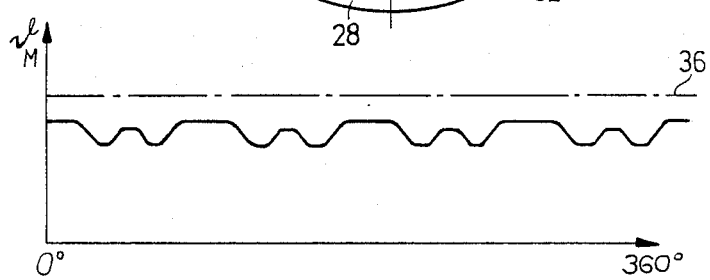
FIGS. 3c and 3d are plot diagrams, respectively, of the temperature distribution in the motor operating under the conditions expected in FIGS. 3a and 3b.
Figure 3B:
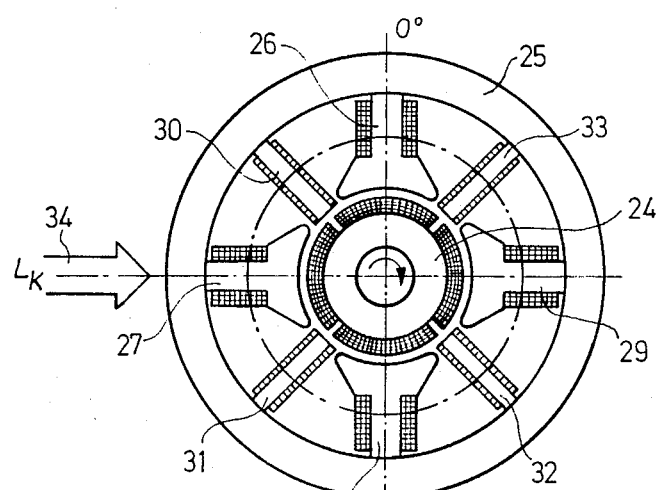

FIGS. 3a and 3b are similar cross-sectional views of a DC shunt motor with a rotor 24, a stator 25 and main poles 26 to 29 and commutating or compensating poles 30 to 33.

Figure 3D:
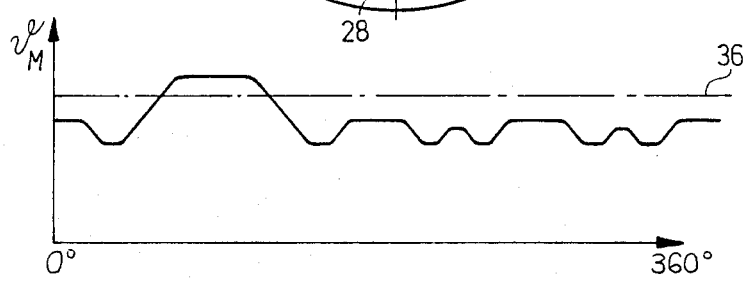

During operation, the motor of FIG. 3a is fully supplied with cooling air $L_K$ as represented by the arrows 34 and 35. The temperature of the motor along the horizontal diametric dot-dash line within the motor is represented in the plot diagram of FIG. 3c. This temperature diagram of FIG. 3c represents a development of the stator along the horizontal dot-dash line of FIG. 3a. The ordinate of the diagram in FIG. 3c indicates the motor temperature which must not exceed a failure or breakdown threshold 36 which represents the upper permissible limit temperature. If failure or disruption of the motor cooling should occur, for example, as is illustrated in FIG. 3b wherein only the air cooling part represented by the arrow 34 remains, the appertaining temperature diagram of FIG. 3d indicates an increase in temperature in vicinity of the main pole 29 which exceeds the failure or breakdown threshold 36. If only the mean motor temperature is determined from the field voltage in a temperature determination process, it is conceivable that, if the interference threshold 36 were locally exceeded, it might not be detected or the motor might become damaged before the overall temperature of the motor exceeded the failure of breakdown threshold. Such a local disruption can also, however, cause the overall temperature to be raised only inconsequentally, yet the disruption can nevertheless, cause damage to the motor. It has been found to be advantageous for avoiding such disruptive action, to determine the increase in the field voltage of the motor and to evaluate therefrom the increase in the motor temperature. To this end, the increase in the field voltage per unit of time is measured, for example, with an evaluation circuit 37 which is connected behind the additional circuit 23, and is compared with a permissible maximum temperature increase. The maximum permissible temperature increase can be determined by various conventional methods.

For example, it is possible to determine this value by simple experimental measurements and make it available as a parameter to the motor and the evaluation circuit, respectively.

A further possibility is that a memory or storage facility may be provided in which the permissible maximum temperature increase is stored.

A third possibility calls for a determination of the temperature increase after the motor is switched on from cold condition. In this regard, starting with the conditions of use or operation which exist for printing-machine drive motors, there is added thereto the assumption that the drive torque requirement of the printing machine is approximately 50 to 100% of the rated or nominal torque in the total rotary speed range and for all temperature and load deviations. Added thereto, furthermore, is the assumption that the temperature variation in the surroundings of the printing machine and the motor is relatively small during initial start-up of the drive when compared with the increase in temperature of the motor. Whereas the rate of change of the surrounding temperature is only a relatively few degrees per hour, the temperature increase of the motor is, for example, 60° to 80° per hour. Taking these assumptions into consideration, a maximum permissible temperature increase curve can be determined.

The maximum temperature increase determined in accordance with one of the aforementioned three possible techniques is compared with the respective instantaneously existing temperature increase values, during the operation of the motor and, in the case wherein the instantaneous temperature increase is greater than the previously determined maximum temperature increase, a warning signal is generated or a switch-off is triggered. Furthermore, the possibility is afforded, during the evaluation of the instantaneous temperature increase, to calculate the anticipated final temperature value. In this regard, by means of at least two measurements, the final value of the heating curve, which extends approximately in accordance with the exponential function e, are determined. In the event too high a value is produced through this calculation, a warning signal can be issued within adequate time and a protective measure, such as by intensified cooling of the motor, for example, can be taken, respectively.

To monitor the temperature of the motor, it is quite sufficient, in the special case of the main drive of the printing machine, if a comparison of the instantaneous temperature increase is performed with the previously determined value only if a given lower limiting temperature is exceeded.

Figure 4:
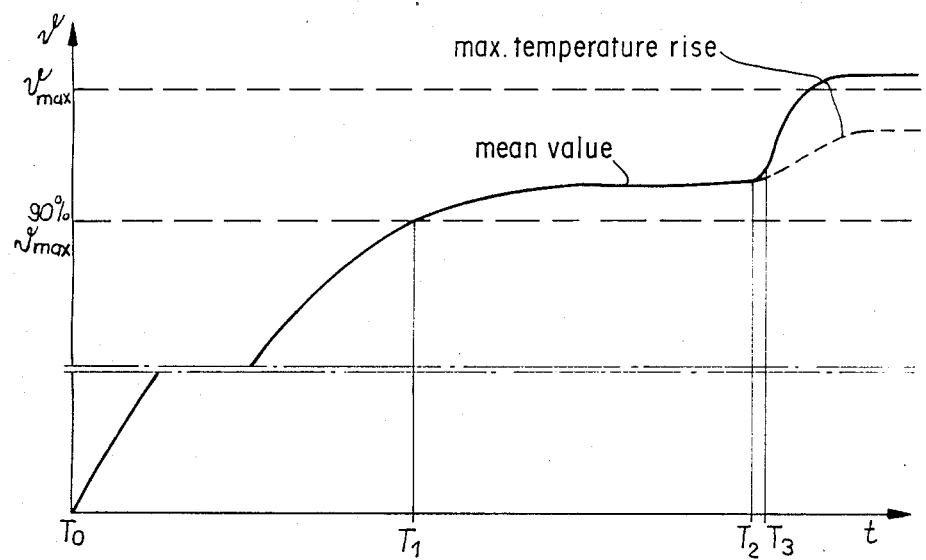
FIG. 4 is a time-rate of change diagram of the temperature of a motor.

In the diagram of FIG. 4, a typical motor heating curve taken over a period of time is shown. This represents the mean value of the motor temperature. At the instant of time $T_o$, the motor is started up, and the motor temperature increases approximately in accordance with the behavior of the function exponential e. At the time instant $T_1$, the motor temperature exceeds a lower limiting temperature (90% $\theta_{max}$). At this temperature, activation of the monitoring operation takes place i.e. from this instant of time on, the instantaneous temperature increase is compared with the previously determined maximum temperature increase value. At the instant of time $T_2$, the mean motor temperature is increased sharply, for example, by the failure of a cooling element, and exceeds the maximally possible temperature increase. This directly generates a warning signal (at the time instant $T_3$), so that measures for remedying or eliminating the disruption can be undertaken in a timely manner, and so that the mean motor temperature cannot increase to the shut-off threshold ($\theta_{max}$). This measure thus excludes any possibility of local temperature increases, which are above the mean motor temperature, from rising at all above the shut-off threshold and from causing any disruption or failure of the motor. The maximally possible temperature increase is always measured, as is apparent from FIG. 4, so that the final value of the temperature is spaced reliably from the shut-off threshold ($\theta_{max}$).

Figure 5:
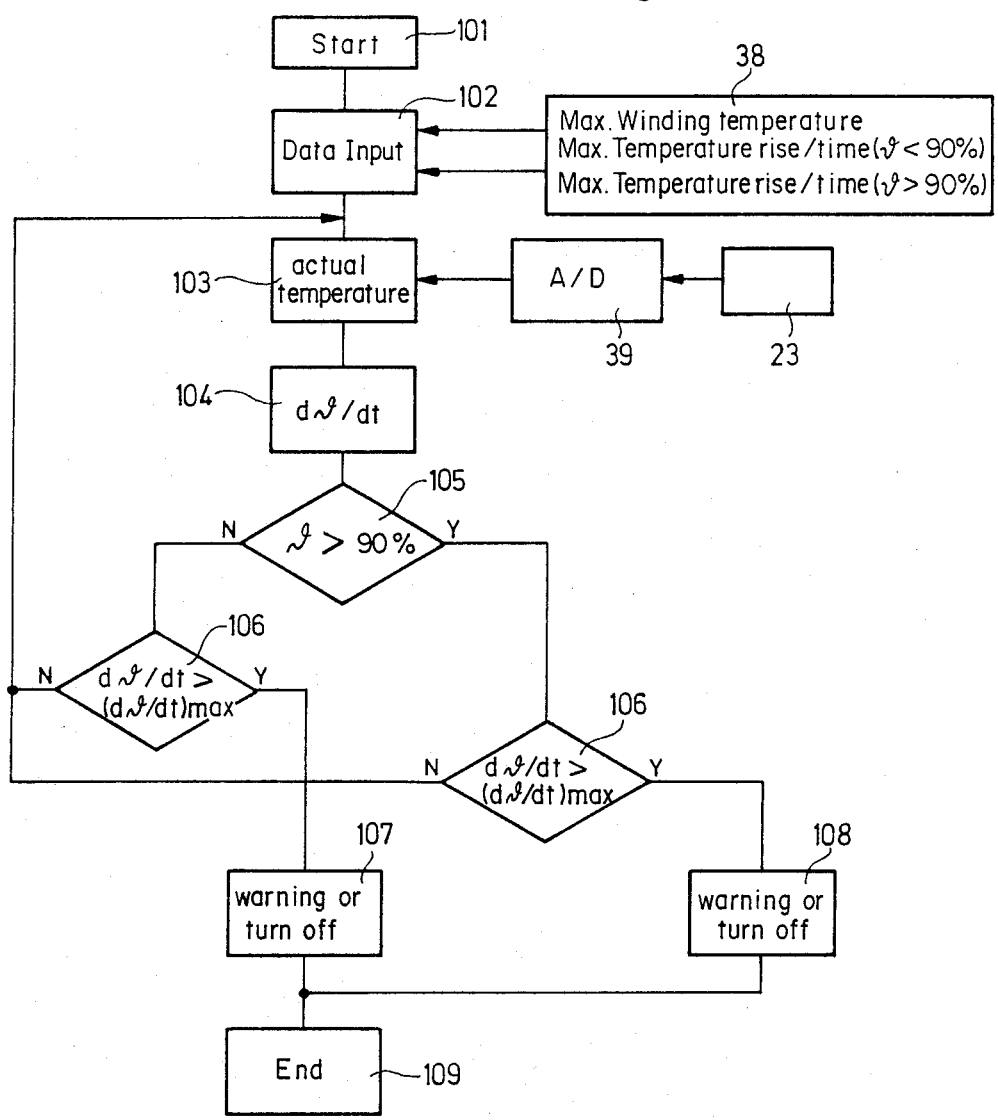
FIG. 5 is a flow-chart of the monitoring of temperature in accordance with the invention.

FIG. 5 is a flow diagram which clarifies the manner of operation of the evaluation circuit 37. After a starting signal 101, a data input 102 occurs. The maximum temperature $\theta_{max}$ (in accordance with the class of insulation), the maximum temperature increase per time attained below the temperature threshold at 90% of the maximum temperature, and another maximum temperature increase per time attained between the temperature threshold at 90% of the maximum threshold and the shut-off threshold are fed to this data input 102 from a memory or storage device 38. The mean motor temperature measured by the circuit 23 is made available (statement 103) as the actual temperature value via an analog-to-digital (A/D) transducer 39 and, from this actual temperature value, the differential with respect to time ($d\theta/dt$) is formed in the statement 104. Thus, the data, the instantaneous temperature and the instantaneous temperature increase made available by the memory or storage device 38, are available. In the query 105, there is determined whether the instantaneous temperature is located above or below the 90% threshold. It should be noted at this point that this threshold has been arbitrarily selected and, depending upon the demand as to the reliability of the motor, can be optionally determined. If the instantaneous temperature lies below this threshold then, in a subsequent query 106, the instantaneous temperature increase is compared with the maximum temperature increase applying in this range and, if the temperature increase is too high above the statement or instruction 107, a warning is issued or the motor is shut off. If no failure or disruption exists i.e. the instantaneous temperature increase is normal, the cycle of determining the actual temperature (statement 103) and the subsequent calculation are repeated. If the instantaneous temperature lies above the 90% threshold, the query 105 then follows the query 106 in which, through a comparison of the instantaneous temperature increase with the stored temperature increase applicable in this range likewise, a disruption and normal operation, respectively, are recognized. In the case of a disruption or failure, shut-off of the motor is effected via the statement 108, and when there is a normal temperature increase, the cycle is repeated with a new determination of the actual temperature. Naturally, it is also possible not to perform the temperature increase comparison below the 90% threshold.

In the same way, there is also the possibility of combining different types of monitoring, for example, to monitor the mean motor temperature independently of the behavior of increase in order thereby to increase the reliability of the device. The shut-off threshold and the maximum temperature of the motor, respectively, can likewise be arbitrarily determined as the 90% threshold. Conventionally, however, this is determined by the class of insulation of the motor.

I claim:

1. Device for monitoring the temperature in a DC shunt-wound motor having a DC-shunt winding and constant shunt current feed for feeding constant current to said DC-shunt winding for driving rotary printing machines, comprising a temperature measuring sensor including the DC-shunt winding; means for sensing the DC-voltage across the shunt winding, having an output voltage being responsive to the temperature of the shunt winding; and an evaluation circuit being responsive to said output voltage for evaluating the temperature of the DC shunt-wound motor.

2. Device for monitoring the temperature in a DC shunt-wound motor having a DC-shunt winding and constant shunt current feed for feeding constant current to said DC-shunt winding for driving rotary printing machines, comprising a temperature measuring sensor including the DC-shunt winding; means for sensing the DC-voltage across said shunt winding, having an output voltage being responsive to the temperature of said shunt winding; an evaluation circuit being responsive to said output voltage for evaluating the winding temperature of said DC-shunt winding; and means responsive to the winding temperature for determining a mean value of spatially distributed heating of the DC shunt-wound motor.

3. Device according to claim 2 including means for switching off the motor after a permissible maximum value of the temperature is exceeded.

4. Device according to claim 2, including means for generating a warning signal after a given temperature limiting value is exceeded.

5. Device according to claim 2, including means for reducing the rotary speed of the motor after a given temperature limiting value is exceeded.

6. Device according to claim 2 including a rotary speed sensor having a signal output being fed to said evaluation circuit.

7. Device for monitoring the temperature in a DC shunt-wound motor for driving rotary printing machines, comprising a temperature measuring sensor formed of a DC shunt winding of the DC shunt-wound motor; a memory wherein a maximum temperature increase behavior per unit time within a given temperature range during normal operation of the motor is stored; a comparator for comparing said maximum temperature increase behavior per unit time, during operation of the motor, with a respective instantaneous temperature increase per unit time; and means for switching off the motor when the instantaneous temperature increase per unit time is greater than the stored maximum temperature increase behavior per unit time.

8. Device for monitoring the temperature in a DC shunt-wound motor for driving rotary printing machines, comprising a temperature measuring sensor formed of a DC shunt winding of the DC shunt-wound motor; a memory in which a maximum temperature increase behavior per unit time within a given temperature range during normal operation of the motor is stored, a comparator for comparing said maximum temperature increase behavior per unit time during operation of the motor with a respective instantaneous temperature increase per unit time for outputting a signal, and actuating means being responsive to the output signal in which the instantaneous temperature increase per unit time is greater than the stored maximum temperature increase behavior per unit time, for generating at least one of a warning signal and a motor shut-off signal, said stored maximum temperature increase behavior per unit time being determined in accordance with characteristics of the motor.

9. Device for monitoring the temperature in a DC shunt-wound motor for driving rotary printing machines, comprising a temperature measuring sensor formed of a DC shunt winding of the DC shunt-wound motor; a memory wherein a maximum temperature increase behavior per unit time within a given temperature range during normal operation of the motor is stored; a comparator for comparing said maximum temperature increase behavior per unit time, during operation of the motor, with a respective instantaneous temperature increase per unit time; and means for generating a warning signal when the instantaneous temperature increase per unit time is greater than the stored maximum temperature increase behavior per unit time.

* * * * *